Figure 1:
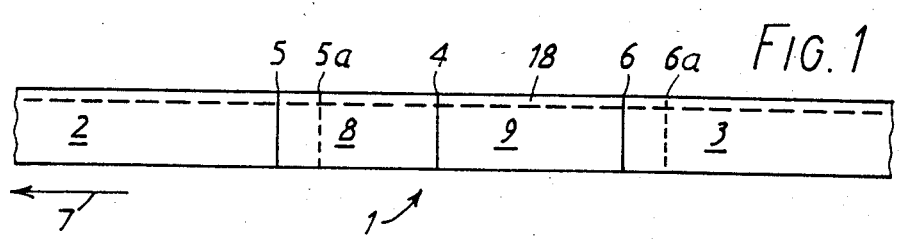

United States Patent [19]

Gaskell et al.

[11] Patent Number: 4,591,926
[45] Date of Patent: May 27, 1986

[54] TECHNIQUE FOR EDITING INTERLEAVED DIGITAL AUDIO DATA

[75] Inventors: Philip S. Gaskell, London, England; Roger Lagadec, Rumlang, Switzerland; Guy W. W. McNally, Shere, England

[73] Assignee: Willi Studer AG, Regensdorf, Switzerland

[21] Appl. No.: 644,203

[22] Filed: Aug. 24, 1984

[30] Foreign Application Priority Data

Aug. 26, 1983 [GB] United Kingdom ............... 8323111

[51] Int. Cl.⁴ ............................................. G11B 27/02
[52] U.S. Cl. ..................................................... 360/13
[58] Field of Search ................. 360/13, 32, 14.2, 50, 360/47, 53

[56] References Cited

U.S. PATENT DOCUMENTS

| 4,351,007 | 9/1982 | Youngquist | 360/13 |
| 4,363,049 | 12/1982 | Ohtsuki et al. | 360/13 |
| 4,423,441 | 12/1983 | Ozaki et al. | 360/13 |

FOREIGN PATENT DOCUMENTS

| 74841 | 3/1983 | European Pat. Off. | 360/13 |
| 2057745 | 4/1981 | United Kingdom | 360/13 |
| 2082828 | 3/1982 | United Kingdom | 360/13 |

Primary Examiner—Vincent P. Canney
Attorney, Agent, or Firm—Robert F. O'Connell

[57] ABSTRACT

In producing an edited tape (31) the lead-in material up to a first edit point is separated from the lead-out material running from a second edit point by a space containing unwanted material and accommodating the actual or notional splice. The unwanted material ensures correct operation of error protection for all of the wanted material on replay. The first and second edit points are marked by codes placed on the tape (31) by a code processor (43) and supplementary head (42). During replay the digital data recovered from the tape by a head (32) is entered into a random access buffer store (34) under control of a write address generator (38) and read out to output electronics (37) under control of a read address generator (39) running at the audio sampling rate. The write address generator (38) normally runs at a rate corresponding to tape speed but the code processor detects the codes for first and second edit points and a control unit (51) stops the write address generator (38) between such points so as to discard the unwanted material. The store is then replenished by speeding up the tape by a comparator (40) and speed control unit (10) in an arrangement which preserves a constant relationship between the read and write addresses, i.e. a constant degree of filling of the memory (34).

24 Claims, 8 Drawing Figures

TECHNIQUE FOR EDITING INTERLEAVED DIGITAL AUDIO DATA

FIELD OF INVENTION

This invention relates to a method for editing digital audio data recorded on a magnetic tape, a method for replay of a tape thus edited and an apparatus for editing and replay of digital audio data on a tape.

PRIOR ART

Different types of editing may be executed in audio editing. For example if wanted passages of a speech or music from different takes or sections of the master recording are to be linked, then it is assembly edits which are involved. Similarly, the final mixes of the various items for an "album" must be arranged in the desired sequence with the proper amount of lead-in between each selection. Condensing edits are used when it is necessary to reduce playing time or remove quiet passages, remove sentences, words etc. from a master recording. For insert edits, portions of one or more existing channels are altered by inserting fresh material from the studio.

Regardless of the type of editing involved the edited tape has one or more edits in it where an edit is defined as the place where the material changes from a lead-in tape or material to a lead-out tape or material. At each edit there is an actual splice point if the edit has been effected by cutting and splicing. There is a notional splice point if the editing has actually been performed electronically.

For transmission and recording of a message or of digitized audio information, the corresponding bits are organised and arranged in a particular format. Choice of an efficient format is essential for economical transmission and recording of data. In particular it is necessary to include certain error checking/correcting facilities (error protection) such as the incorporation of cyclic redundancy check codes.

PROBLEM

Editing of digital audio data recorded on a magnetic tape as it is actually done is not entirely satisfactory in professional use. This is because the editing of such data is limited by the capabilities of the error correction devices used. These error correction devices are capable of replacing lost bits or lost data on the basis of the redundant information previously added to the digital data on the tape. More serious errors which are beyond the correcting capability of the error protecting check code are concealed by approximating the missing samples from adjacent error free ones.

In order to reduce further the effects of drop-outs, especially drop-outs due to editing, or cutting of the tape, an interleaving process is applied to the data on recording. This consists in dispersing the digital samples along the tape before recording and in re-ordering them on play-back or replay. In this way, consecutive data are stored far apart, and the bursts of errors due to drop-outs caused by the cutting of the tape are distributed more evenly among the digital samples.

Unfortunately these measures do not suffice to enable the professional user to perform all kinds of edits perfectly. In most of the edits, too many samples of the digital audio data are lost.

The object of the present invention is therefore to avoid these drawbacks and to provide a method for performing edits with a perfect professional quality as well as a method for replay of edited tape and an apparatus for carrying out these methods.

INVENTION

According to the present invention there is provided a method of editing digital audio data on a magnetic tape characterised in that the edited tape is provided at each edit with coded information identifying a first edit point up to which lead-in material is to be replayed, and a second edit point spaced from the first edit point and from which lead-out material is to be replayed, and in that unwanted lead-in and/or lead-out material is recorded in the space between the first and second edit points.

The invention also provides a method of replaying a tape editing by this method, wherein the audio data is replayed via a buffer store and in that the unwanted material is eliminated by reading out from the store the lead-in material up to the first edit point followed immediately by the lead-out material from the second edit point.

OPERATION

The invention makes perfect edits possible. On the one hand, the unwanted material recorded in the space between the edit points can be sufficient to ensure proper operation of the conventional error protection mechanism on replay. What unwanted material is recorded will depend upon the nature of the protection mechanism but preferably unwanted lead-in material is recorded in the said space from the first edit point up to an actual or notional splice point and unwanted lead-out material is recorded in the said space from the splice point up to the second edit point.

Although the unwanted material performs this useful function it is eliminated in the method of replaying the tape, effectively by jumping from the first edit point to the second when reading data out of the buffer store. Such a jump may be implemented by jumping a read-out address or by preventing write-in during the space between the first and second edit points. The coded information which enables this to be done may be on a separate dedicated track or be interleaved with the audio data. Other coded information may be used to define a replay gain profile, e.g. in producing cross-fade edits.

DRAWINGS

The apparatus according to the invention and advantageous developments of the method and apparatus are defined in the appended claims.

Figure 2:
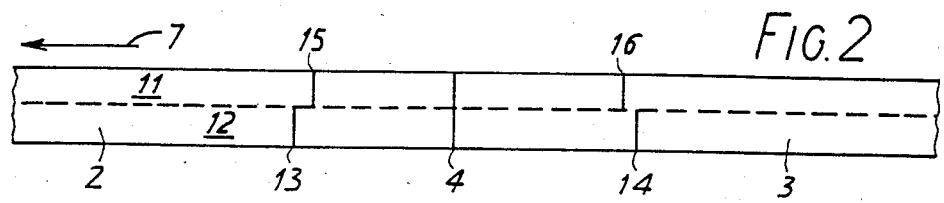
Figure 3:
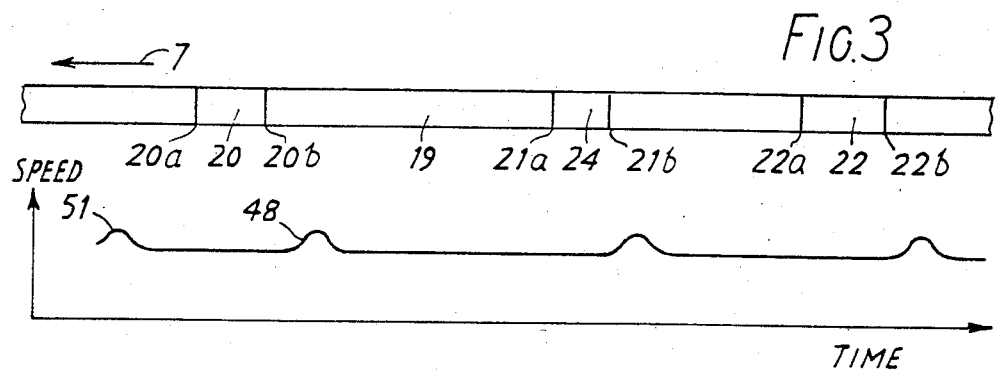
Figure 4:
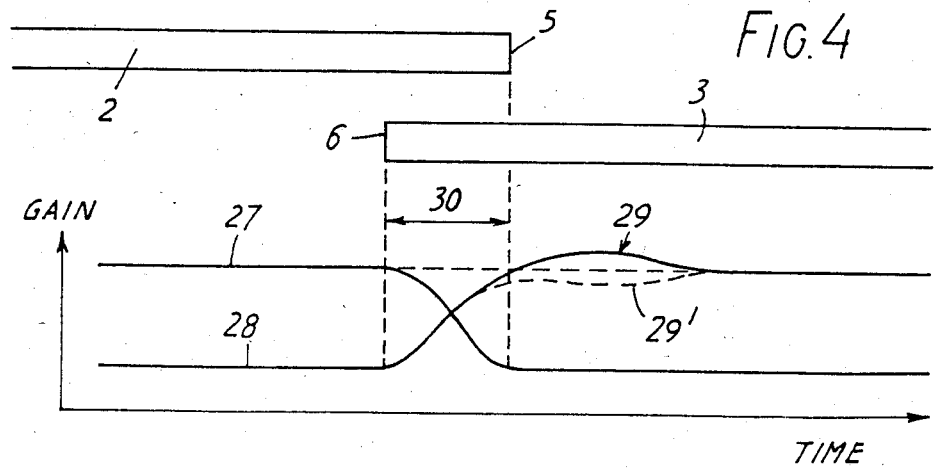
Figure 5:
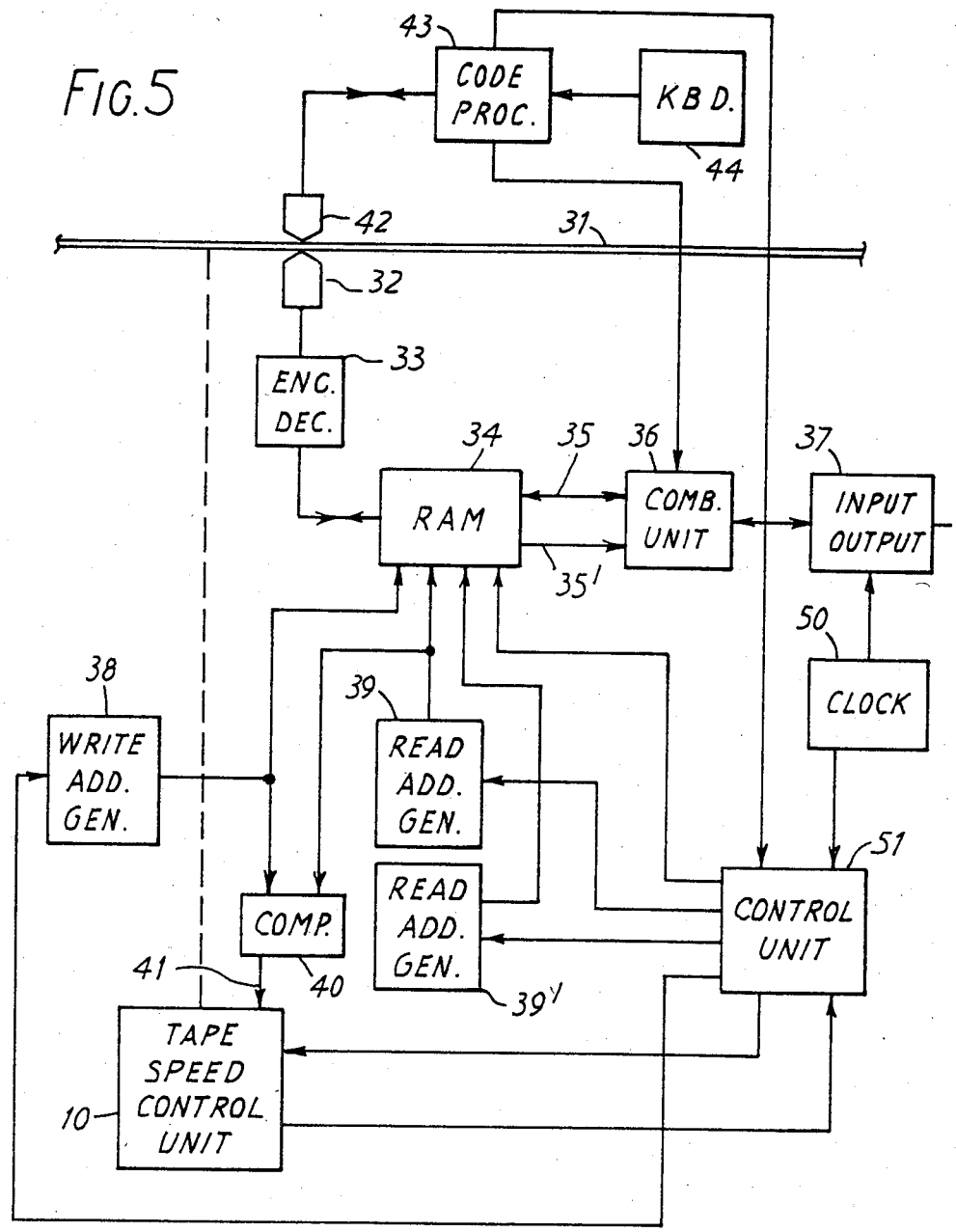
Figure 6:
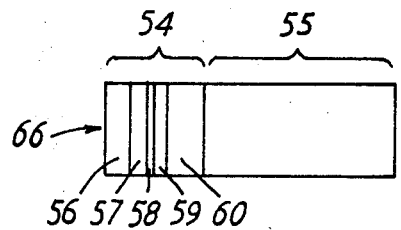
Figure 7:
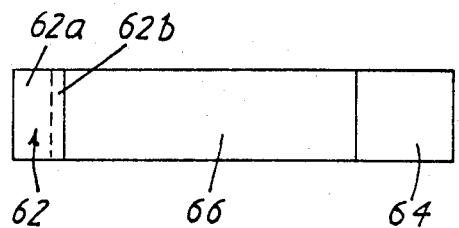
Figure 8:
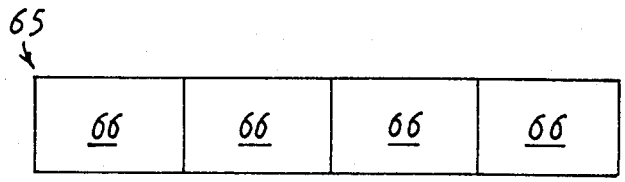

The invention will be described in more detail, by way of example, with reference to the accompanying drawings, in which:

FIG. 1 shows an example of an edit on a magnetic tape loaded with digital audio data, FIG. 2 shows an edit as in FIG. 1 but for two different data channels on the tape, FIG. 3 shows a tape with a plurality of edits associated with a diagram showing the speed of the tape during replay, FIG. 4 shows a piece of lead-in and a piece of lead-out material following replay as well as a diagram showing gain-profiles for both tape materials, FIG. 5 is a block diagram of apparatus embodying the invention, and FIGS. 6, 7 and 8 show structures for accommodating data on a tape.

FIG. 1 shows an edit 1 on two tapes 2 and 3, namely a lead-in tape 2 and a lead-out tape 3. The two tapes 2,3 are joined together in a splice point 4. FIG. 1 therefore shows a so called tape-splice edit as an example. Other types of edits may be handled much the same way except that there is no physical cutting-point 4. The actual or notional splice point lies between two edit points 5 and 6.

FIG. 1 is based on the assumption that the tapes 2, 3 move according to the direction of an arrow 7 past a replay head. The distance between the splice point 4 and the edit points 5 or 6 has to be sufficient that damage resulting from the splice does not impede the perfect reconstruction of the digital-audio data up to the first edit point 5 and beyond the second edit point 6.

Areas 8 and 9 between the edit points 5 and 6, i.e. between the edit points 5 and 6 respectively and the splice 4, contain data which are immaterial to the replaying process. This data is corrupted by the splice 4 and is of no consequence. As a result the replay machine has to ignore data contained between edit point 5 and the edit point 6 during replay. In practice the data to be ignored may account for 100 milliseconds of unwanted audio-time. Although it is ignored, it allows the error protection devices of the replay machine to function correctly during replay. These devices are not shown but act in conventional manner. To enable replay machine to "jump" between two edit points 5 and 6, the tapes 2 and 3 contain coded information defining the location of the edit points 5 and 6. This coded information may be provided according to any suitable technique. For example the coded information may be on a separate dedicated track 18 or it may be interleaved with the digital audio data.

FIG. 2 shows tapes 2 and 3 as shown in FIG. 1. These tapes 2 and 3 join in the same splice point 4. In this example the tapes 2 and 3 are recorded with two different tracks 11 and 12, so we have to deal now with four different edit points as numbered 13 to 16. These can all be identified by corresponding coded information.

FIG. 3 shows a part of a tape 19 containing three edits 20, 21 and 22 with first edit points 20a, 21a and 22a and second edits points 20b, 21b and 22b. The diagram associated with the tape 19, shows the relation of the speed of the tape 19 to time. Variations of tape speed during the replay operation and the reasons will be explained more in detail later on.

When the tape of FIG. 1 is replayed, the material may appear with the editing points 5 and 6 coincident because the unwanted material has been eliminated. However it is also possible to create an overlap for the purpose of a cross-fade for example. This is illustrated in FIG. 4 where the lead-in material is read out of the store up to point 5 while lead-out material is read out from point 6 commencing before point 5 is reached in the lead-in material. There is thus a period of overlap 30 during which two read address generators have to be operating in time interleaved manner with combination of read-out samples, as will be described below.

FIG. 4 also shows associated replay gain profiles which define the gain for the replayed material and may be used for various purposes. The example illustrated is for a cross fade. The time scale of FIG. 4 is greatly compressed relative to FIG. 1. For the lead-in material, the gain profile 27 falls off smoothly up to the point 5 while, for the lead-out material, the gain profile 28 rises from the point 6. If the recording levels of the tapes 2 and 3 are not the same, the gain profiles may compensate to allow the ear time to adopt to the new level. If the tape 3 has a relatively low level, a temporary enhancement of gain is appropriate, as indicated by the part 29 of the profile 28. The opposite case of a temporary lowering of gain is shown in broken lines at 29'. These profiles may be established by further coded information recorded on the tape. The replay machine may be equipped to respond to such coded information by following pre-programmed gain profiles. However, the profiles are preferably defined more fully by a succession of codes. This allows more flexibility as the editor can adapt the profile to suit a given edit.

FIG. 5 is a block diagram of an apparatus for editing and replaying edited tape material. The apparatus comprises a tape machine of known form, equipped to record and replay digital audio data. Since such machines are well known, the tape machine itself is not shown in detail. FIG. 5 shows only the magnetic tape 31, a record/replay head 32 and a block 10 representing the tape speed control unit which comprises a capstan and motor in a closed loop servo system which can derive a feedback signal representing tape speed either from a clock track on the tape itself or from a tachometer coupled to the capstan. Although a read-write head 32 is shown for simplicity, it will be appreciated that separate record and replay heads will normally be employed.

The head or heads are coupled by way of a conventional encoder/decoder 33, which implements whatever format is employed for the bits of the digital data, to a RAM store 34 which can comprise solid state RAM chips operating with fixed timing locked to the audio sampling rate and including several write cycles per sampling interval for accommodating fluctating incoming data rates, as well as several read cycles for ease of processing, especially in effecting cross-fades. Electronic stores of this kind are well known in current digital audio technology.

The store 34 acts as a buffer between the magnetic tape 31 and conventional input/output electronics 37 which operate strictly at the audio sampling rate, determined by a clock source 50. A combining unit and gain control 36 may be interposed between lines 35, 35' from the store and the input/output electronics 37, for a purpose explained below.

Digital samples are written into the store 34 under control of a write address generator 38 and are read out under control of a read address generator 39. A control unit 51 determines the mode of operation of the apparatus. For a recording operation, as in producing an edited tape, the store 34 writes data from the input/output electronics 37 and reads data out to the tape head 32. The write address generator 38 runs at the audio sampling rate established by the clock source 50 and steps cyclically through the addresses of the store. The read address generator 39 operates in the same way but it is clocked at a rate corresponding to instantaneous tape speed under control of a signal representing this speed and provided from the unit 10 to the unit 51 on a line 52. Conversely, for a replay operation, the control unit 51 switches the store 31 to write from the tape head 32 and to read out to the input/output electronics 37. The write address generator 38 is now clocked in dependence upon tape speed whereas the read address generator 39 is clocked at the audio sampling rate.

By clocking the read address generator 38 in dependence upon tape speed during recording, a uniform spacing of the recorded samples on the tape 31 is assured. On the other hand, by clocking the write address generator 38 in accordance with tape speed during replay it is ensured that the samples recovered from the tape 31 are correctly entered into the store 34.

A comparing unit 40 is connected to the two address generators 38 and 39 and monitors the degree of filling of the store on the basis of the difference between the write and read addresses. In the preferred mode of operation, the degree of filling of the store is maintained substantially constant and, to this end, the comparing unit 40 provides a signal on a line 41 to the tape speed control unit 10. The mode control unit 51 also switches the operation of the unit 10 so that, during recording, if the store 34 gets too full, the tape is speeded up so as to withdraw additional samples from the store whereas, during replay, if the store gets too full, the tape is slowed down to reduce the rate at which samples are written into the store.

During the production of an edited tape it is necessary to record coded information defining the edit points 5 and 6 and possibly also the gain profile (FIG. 4). In the embodiment of FIG. 5 it is assumed that the coded information is recorded on a separate dedicated track 18 (FIG. 1) by way of a record/replay head 42. This may be a separate head as shown or be part of a multi-track record/replay head 32, or separate multi-track record and replay heads. The head 42 is connected to a code processor 43 which can emit control codes during recording and receive and act upon control codes during replay. Before considering operation of the apparatus during recording and replay, some possible data structures for the control codes may be explained. The data structure may consist of a data block 65 divided into a plurality of labels 66, as shown in FIG. 8. For example, the block may have a total length of 192 bits, divided into four labels of 48 bits each. FIG. 6 shows a possible label format. The label is divided into an identification field 54 and a parameter field 55 which may consist of 16 bits and 32 bits respectively. The identification field 54 is composed of a label class field 56 of 4 bits, a security level and count down field 57 of 3 bits, a label frame synchronisation field 58 of 1 bit, a priority level field 59 of 2 bits and an instruction field 60 of 6 bits, for example. Such a format permits considerable flexibility in defining and responding to control codes but for the purposes of understanding the present invention it is sufficient to consider the instruction field 60 as including an instruction which identifies the control operation in question. For example two instructions may respectively define a first edit point 5 and a second edit point 6. Some instructions will additionally require parameter values which are placed in the field 55. For example, in order to establish a desired replay gain profile, one instruction may specify a gain setting operation, the value of the gain being included in the parameter field 55.

Known techniques may be employed to ensure adequate error protection for the labels and FIG. 7 shows one possibility. The total label size is increased to 72 bits and each label is made up of an 8 bit preamble field 62, the 48 bit label field 66 itself and a 16 bit cyclic redundancy check field 64. The preamble field 62 may consist of a 6 bit HDM-1 violating preamble word 62a and a 2 bit overwrite number field 62b.

Further information on these matters may be found in our copending U.S. application Ser. No. 644,182, filed Aug. 24, 1984 by Philip Stuart Gaskell et al.

Consider now operation during production of an edited tape. The editor has to select his first edit point 5 and his second edit point 6 on the lead-in material and the lead-out material respectively. This may be done in conventional manner as in the normal editing technique where the two edit points actually define the splice point for the two tapes. Having selected the edit points 5 and 6, the corresponding identifying codes have to be recorded on the dedicated track 18 and this is readily achieved by way of the code processor 43 under control of a keyboard 44, for example. The editor keys in an instruction to define a first edit point and the code processor 43 records the corresponding label via the head 42, and similarly for the second edit point 6. The editor can also use the keyboard 44 to enter a series of codes defining a gain profile by a series of values spaced sufficiently closely to approximate to the desired profile, as in FIG. 4.

The labels can be recorded on two source tapes before they are spliced or electronically combined to form the edited tape. Alternatively the labels can be recorded on the edited tape after production thereof. If the editing is performed electronically, it is possible to record the labels during the production of the edited tape from the two source tapes.

Regardless of the way in which the labels are recorded, the actual or notional cutting point 4 is selected to be spaced sufficiently after the first edit point 5 and sufficiently in advance of the second edit point 6 to incorporate the unwanted material 8, 9 (FIG. 1) which will ensure efficient operation of the conventional error protection mechanisms.

When the edited tape is replaced using the apparatus of FIG. 5, the code processor 43 detects and responds to the labels replayed by the head 42. The code processor in turn controls operation of the address generators by way of the control unit 51. According to the simplest and preferred mode of operation, whenever a label defining a first edit point 5 is encountered, the control unit 51 stops the write address generator 38. When the ensuing label defining the second edit point 6 is encountered, the write address generator 38 is restarted. The unwanted material between the two edit points is therefore never written into the store 34. Since the read address generator 39 continues to run in an uninterrupted and regular fashion, the replayed material simply jumps from the edit point 5 to the edit point 6.

In an alternative technique, the control unit 51 monitors the time between the first and second edit points as signaled by the code processor 43 and jumps the read address generator 39 by a corresponding amount when this generator reaches the address corresponding to the first edit point 5. This technique is perfectly feasible but more complex to implement than the preferred technique of stopping the write address generator 38 between the two edit points.

It is clear that, however the unwanted material is eliminated from the output data sent to the input/output electronics 37, the contents of the store 34 are depleted. Account must be taken of this particularly when there is a succession of edits as in the example of FIG. 3, each of which will effect a corresponding depletion of the store.

It is possible to use a store 34 which has sufficient capacity to allow for the maximum number of edits which will be encountered in practice. The store must be adequately precharged at the beginning of replay. A preferred technique is to make up the contents of the store 34 after each edit and this is achieved automatically in the illustrated embodiment by the operation of the comparing unit 40 acting on the tape speed control unit 10. Following every edit, the store contents fall and the signal on the line 41 causes the tape to speed up until the store has been replenished. This is illustrated in FIG. 3 where the tape speed is normally constant but exhibits a burst 48 of additional speed after each edit. It is still necessary to effect some precharging of the store 34 on commencing replay and this may be associated with a fast start up as described in our co-pending U.S. application Ser. No. 644,194, filed Aug. 24, 1984.

If the tape is started up rapidly as described in the co-pending application, the store will be precharged while the tape speed initially overshoots and data samples are accordingly written into the store more rapidly than they are read out (since read out during replay is always at the constant, audio sample rate).

The code processor 43 also detects labels defining gain values and can control replay gain via the combining unit 36 which contains, in respect of each channel 35, 35', a register for storing a gain value (and which is updated whenever a label specifies a new gain value) and a digital multiplier which multiplies the digital samples by the gain value. The code processor 43 may be a suitably programmed microprocessor which can incorporate the control unit 51 with an output port to effect the necessary control of the store 34, the address generators 38 and 39 and the tape speed control unit 10, as well as an input port for the tape speed signal on the line 52. The operations described above, both in relation to production of an edited tape with labels and the replay of an edited tape can readily be flow charted and implemented by software written in the appropriate microprocessor language. Since such implementation of control functions is completely state of the art, it is not described in detail herein.

If cross-fade or multi-overlap edits are to be executed, the combining unit 36 accepts one or more outputs through the lines 35, 35' from the store 35 and combines the outputs into a single signal fed to the input/output electronics 37. This is effected in the region of overlap 30 (FIG. 4) by having two read-outs per sampling interval effected by two read address generators 39 and 39' of which one reads ahead of the other by an amount corresponding to the overlap 30. The store 34 must obviously have sufficient capacity to allow this. The alternative samples are processed in their respective digital multipliers so that the gain profiles pertaining to each are implemented. The samples are then added in pairs to produce the output samples which pass at sample rate to the electronics 37.

For multiple overlap edits more than two channels and corresponding read address generators can be provided.

The method according to the invention allows edit points to be shifted slightly even after the tape has been cut and spliced or electronically edited. In the immediate vicinity of the splice point 4 (FIG. 1), the tape is damaged and the data is corrupted. However, if the positions of the edit points 5 and 6 have been chosen with some margin for error, the data immediately to the right of the point 5 and to the left of the point 6 in FIG. 1 are likely still to be valid even after the splice has been made. Obviously, data to the left of the point 5 and to the right of the point 6 are certainly valid, since they are far removed from the splice point 4. The original positions of the edit points 5 and 6 are defined by the coded information put on the separate track 18 on the tape (or interleaved with the audio data). By overwriting this coded information, the edit points may be redefined. In the example of FIG. 1, the edit is shown shifted slightly to the right with new edit points defined at 5a and 6a. In this operation, only the coded information is altered; the original audio data itself remains unchanged. By means of such operations, it is possible to correct slight errors in the original determination of the points 5 and 6 and improve the audible effect of the edit.

An apparatus which is to be used only for the process of editing the tape but not to replay it, may be significantly simplified. This is because of edits are only defined by the coded information and the apparatus need not be equipped with a store 34 and address generators 38, 39 and so on. The apparatus can consist essentially of a conventional tape drive and audio electronics for recording only supplemented by a coding device for writing labels on to the dedicated track 18.

On the other hand, apparatus for tape replay requires the facilities of FIG. 5 in order to make it possible to eliminate the unwanted material between the edit points 5 and 6.

If the coded information relating to edits of a tape having a plurality of audio channels or tracks is to be handled by a single dedicated track 18, then well known multiplexing techniques may be used. On the other hand, the control information for each audio track may be time division multiplexed to the audio track itself.

What is claimed is:

1. A method of editing digital audio data on a magnetic tape characterised in that the edited tape is provided at each edit with coded information identifying a first edit point up to which lead-in material is to be replayed, and a second edit point spaced from the first edit point and from which lead-out material is to be replayed, and in that unwanted lead-in and/or lead-out material is recorded in the space between the first and second edit points.

2. A method according to claim 1, wherein unwanted lead-in material is recorded in the said space from the first edit point up to an actual or notional splice point and in that unwanted lead-out material is recorded in the said space from the splice point up to the second edit point.

3. A method according to claim 1, wherein further coded information is recorded defining a varying gain profile for at least one of the lead-in material preceding the first edit point and the lead-out material material following the second edit point.

4. A method according to claim 3, wherein the gain profile for the lead-out material increases from a low gain to a gain offset from a normal gain and then reverts to the normal gain.

5. A method according to claim 1, wherein the coded information is recorded on a separate tape track.

6. A method according to claim 5, wherein the coded information pertaining to a plurality of audio tracks is multiplex on to a single separate tape track.

7. A method according to claim 1, wherein the coded information is interleaved with the audio data on the track(s) carrying the audio data.

8. A method according to claim 1, wherein the coded information is recorded in labels having a predetermined format.

9. A method according to claim 8, wherein the label format comprises an identification field and a parameter field.

10. A method according to claim 8, wherein the label format also comprises a protection field.

11. A method of replaying a tape edited by the method according to claim 1, wherein the audio data is replayed via a buffer store and the unwanted material is eliminated by reading out from the store the lead-in material up to the first edit point followed immediately by the lead-out material from a point which is not earlier than the second edit point.

12. A method according to claim 11, wherein the buffer store is a random access store with cyclic write address and read address generators and wherein the write address generator is stopped between the first and second edit points.

13. A method according to claim 11, wherein the buffer store is a random access store with cyclic write address and read address generators and wherein the read address generator is jumped.

14. A method according to claim 11, wherein the buffer store is a random access store with cyclic write address and read address generators and wherein the write address generator is clocked in dependence upon tape speed and the tape speed is increased temporarily after each edit so as to replenish the store.

15. A method according to claim 14, wherein the tape speed is controlled inversely in dependence upon the degree of filling of the store.

16. Apparatus for replaying digital audio data from a tape edited by the method of claim 1, comprising a random access buffer store receiving data from the tape under control of a cyclic write address generator and feeding out data under control of a cyclic read address generator, means for recovering the coded information from the tape, and control means responsive to the coded information identifying the first and second edit points so to control at least one of the address generators as to eliminate the unwanted material from the data fed out from the store.

17. Apparatus according to claim 16, wherein the control means arrest the write address generator between the first and second edit points.

18. Apparatus according to claim 16, wherein the control means jump the read address generator.

19. Apparatus according to claim 16, comprising means for clocking the write address generator at a rate proportional to tape speed.

20. Apparatus according to claim 16, comprising means for comparing the write and read addresses and a tape speed control unit responsive to a signal provided by the comparison to control the speed of the tape inversely in relation to the degree of filling of the store.

21. Apparatus according to claim 16, comprising a combining unit for combining a plurality of outputs from the store clocked out by read address generators individual thereto.

22. Apparatus according to claim 16, comprising a code processor operable during replay to recover the coded information from the tape and also operable when producing an edited tape to record the coded information on the tape.

23. Apparatus according to claim 22, wherein the code processor is coupled to a head or heads cooperating with a dedicated track for the coded information.

24. A method of editing interleaved digital audio data on a magnetic tape, comprising the steps of
providing and recording lead-in digital audio data which are to be combined with lead-out digital audio data on the tape in such a way that said lead-in data will be followed by said lead-out data and said lead-in and lead-out data are separated by an actual or notional splice points;
providing and recording coded information on the tape identifying a first edit point up to which lead-in audio data are to be replayed;
providing and recording coded information on the tape identifying a second edit point spaced from the first edit point and from which lead-out audio data are to be replayed, said actual or notional splice point being located between said first and said second edit points.

* * * * *